(12) United States Patent  
Silva

(10) Patent No.: US 9,653,961 B2
(45) Date of Patent: May 16, 2017

(54) STATOR SLEEVE WITH INTEGRATED COOLING FOR HYBRID/ELECTRIC DRIVE MOTOR

(71) Applicant: Allison Transmission, Inc., Indianapolis, IN (US)

(72) Inventor: Jorge E. Silva, Anderson, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 128 days.

(21) Appl. No.: 14/641,773

(22) Filed: Mar. 9, 2015

(65) Prior Publication Data

US 2015/0180303 A1    Jun. 25, 2015

Related U.S. Application Data

(63) Continuation of application No. PCT/US2014/020995, filed on Mar. 6, 2014.

(Continued)

(51) Int. Cl.

| | |
|---|---|
| H02K 5/20 | (2006.01) |
| B60K 6/405 | (2007.10) |
| B60K 6/48 | (2007.10) |
| B23P 11/02 | (2006.01) |
| H02K 1/18 | (2006.01) |
| H02K 9/193 | (2006.01) |
| H02K 15/14 | (2006.01) |

(52) U.S. Cl.
CPC ............. *H02K 5/20* (2013.01); *B23P 11/025* (2013.01); *B60K 6/405* (2013.01); *B60K 6/48* (2013.01); *H02K 1/185* (2013.01); *H02K 9/193* (2013.01); *H02K 15/14* (2013.01); *B60K 2006/4825* (2013.01); *Y02T 10/6221* (2013.01); *Y02T 10/6252* (2013.01); *Y10T 29/49009* (2015.01)

(58) Field of Classification Search
CPC ........... H02K 1/185; H02K 5/20; H02K 9/193
See application file for complete search history.

(56) References Cited

U.S. PATENT DOCUMENTS 5,489,810 A    2/1996    Ferreira et al.
6,133,659 A * 10/2000    Rao ....................... B60K 6/105
                                                         123/3

(Continued)

FOREIGN PATENT DOCUMENTS

CN    102280965 B    7/2013
WO    WO 95/29529 A1    11/1995

(Continued)

OTHER PUBLICATIONS

Australia Patent Application 2014241468 Patent Examination Report No. 1 mailed Jun. 29, 2016. 6 pages.

(Continued)

*Primary Examiner* — Dang Le
(74) *Attorney, Agent, or Firm* — Woodard, Emhardt, Moriarty, McNett & Henry LLP

(57) ABSTRACT

A hybrid system includes an electric motor/generator or eMachine with a stator received in a cooling sleeve. The stator is pressed into the cooling sleeve to form a press-fit connection. The press fit connection has sufficient strength to carry the complete torque generated by the eMachine, so the stator will never move relative to the sleeve through the life of the hybrid system.

20 Claims, 3 Drawing Sheets

Related U.S. Application Data

(60) Provisional application No. 61/781,967, filed on Mar. 14, 2013.

(56) References Cited

U.S. PATENT DOCUMENTS

| | | | |
|---|---|---|---|
| 6,455,963 B2 * | 9/2002 | Sakurai | H02K 5/20 310/54 |
| 6,657,332 B2 * | 12/2003 | Balas | F02C 7/08 310/58 |
| 7,284,313 B2 | 10/2007 | Raszkowski et al. | |
| 2005/0206134 A1 | 9/2005 | Raszkowski et al. | |
| 2009/0096300 A1 | 4/2009 | Oyoung et al. | |
| 2012/0258838 A1 | 10/2012 | Hartz et al. | |
| 2012/0267969 A1 * | 10/2012 | Iwamoto | H02K 5/15 310/54 |
| 2012/0286595 A1 | 11/2012 | Pal | |

FOREIGN PATENT DOCUMENTS

| | | |
|---|---|---|
| WO | WO 01/33053 A2 | 5/2001 |
| WO | WO 2012/034031 A2 | 3/2012 |

OTHER PUBLICATIONS

International Search Report and Written Opinion issued in PCT/US2014/020995, dated Jun. 20, 2014. 15 pgs.
European Patent Application 14773545.0 Extended Search Report mailed Nov. 16, 2016.

* cited by examiner

STATOR SLEEVE WITH INTEGRATED COOLING FOR HYBRID/ELECTRIC DRIVE MOTOR

CROSS-REFERENCE TO RELATED APPLICATIONS

This application is a continuation of continuation of International Application No. PCT/US2014/020995, filed Mar. 6, 2014, which claims the benefit of U.S. Provisional Application 61/781,967, filed Mar. 14, 2013, which are hereby incorporated by reference.

BACKGROUND

With the growing concern over global climate change as well as oil supplies, there has been a recent urgency to develop commercially viable hybrid systems for motorized vehicles. One common difficulty experienced with manufacturing hybrid systems relates to properly locating the electric motor/generator within the hybrid system. Tolerance stack ups can occur is between the components within the hybrid system that can lead to misalignment of the motor/generator. The resulting misalignments can cause catastrophic failure.

Thus, there is a need for improvement in this field.

SUMMARY

The hybrid system and technique described herein address several of the issues mentioned above as well as others. A press-fit connection is used to secure the stator of an electric motor/generator to a cooling sleeve. By using a press-fit connection, a number of issues associated with tolerance stack up are avoided such that the electric motor/generator is properly aligned within the hybrid module.

Further forms, objects, features, aspects, benefits, advantages, and embodiments of the present invention will become apparent from a detailed description and drawings provided herewith.

DETAILED DESCRIPTION

Figure 1:
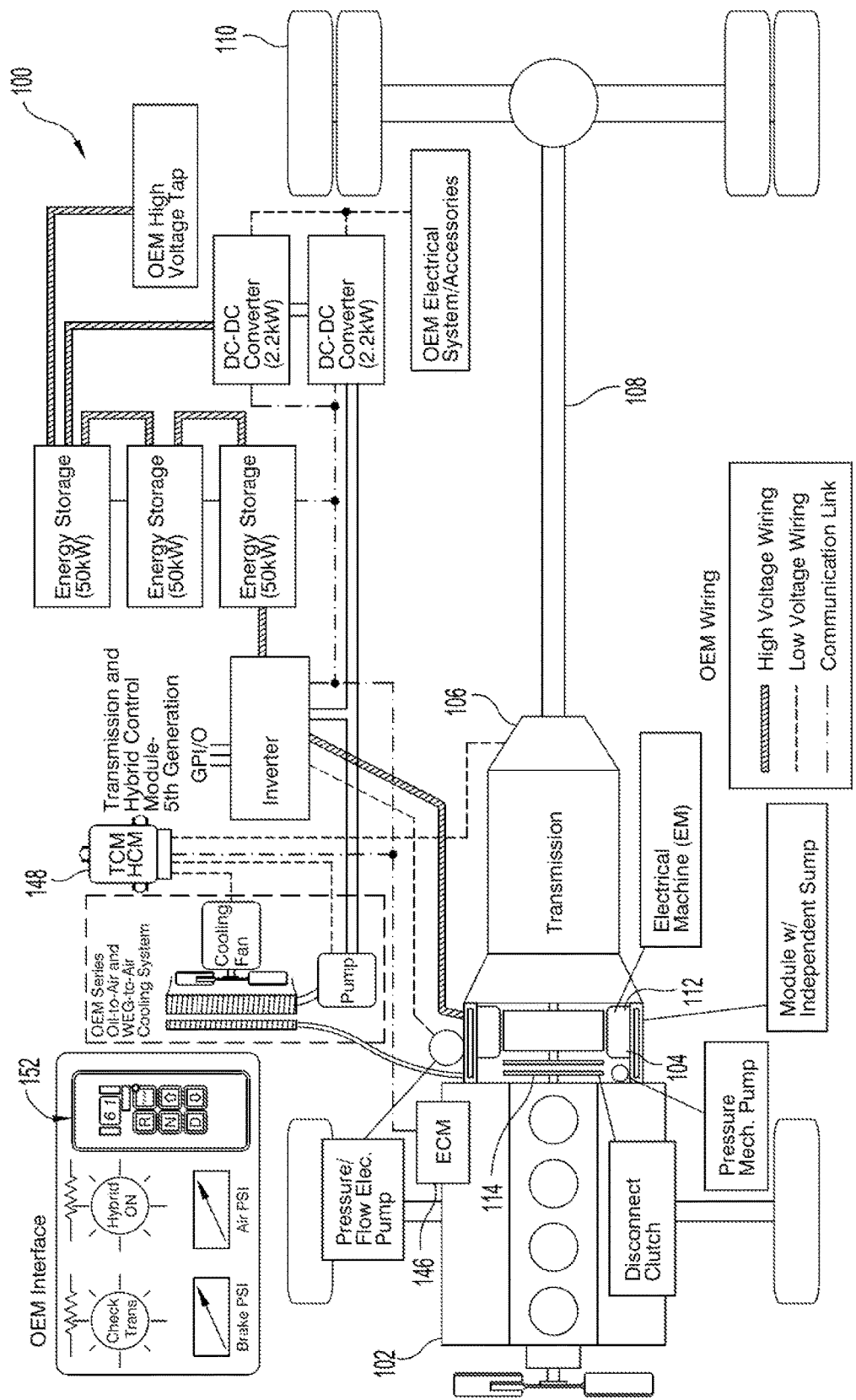
FIG. 1 is a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference is numeral will generally first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 2:
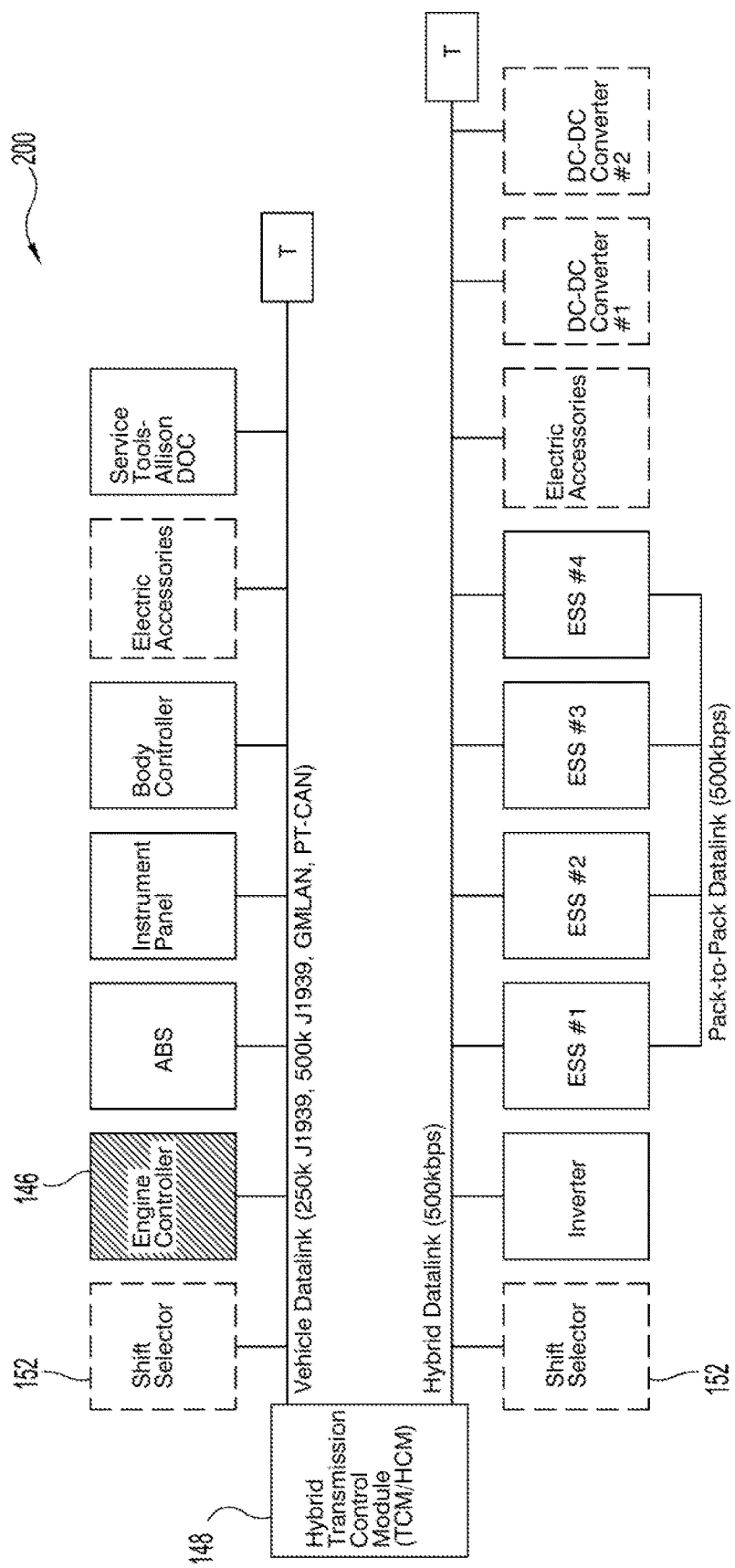
FIG. 2 is a general diagram of an electrical communication system in the FIG. 1 hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine (i.e., an electric motor/generator), commonly referred to as an eMachine 112, and a clutch 114 that operatively connects and disconnects the engine 102 from the eMachine 112 and the transmission 106. The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. In a typical embodiment, the transmission/hybrid control module 148 and engine control module 146 each comprise a computer having a processor, memory, and input/output connections. Additionally, other vehicle subsystems may also contain computers having similar processors, memory, and input/output connections. The system 100 includes a shift selector 152 for selecting whether the vehicle is in drive, neutral, reverse, etc. FIG. 2 shows a diagram of one example of a communication system 200 that can be used in the hybrid system 100. While one example is shown, it should be recognized that the communication system 200 in other embodiments can be configured differently than is shown. The various components of the hybrid system 100 as well as their function are discussed in further detail in U.S. patent application Ser. No. 13/527,953, filed Jun. 20, 2012, published as US 2012/0258838 A1, and International Application No. PCT/US2011/051018, filed Sep. 9, 2011, published as WO 2012/034031 A2, which are hereby incorporated by reference.

Figure 3:
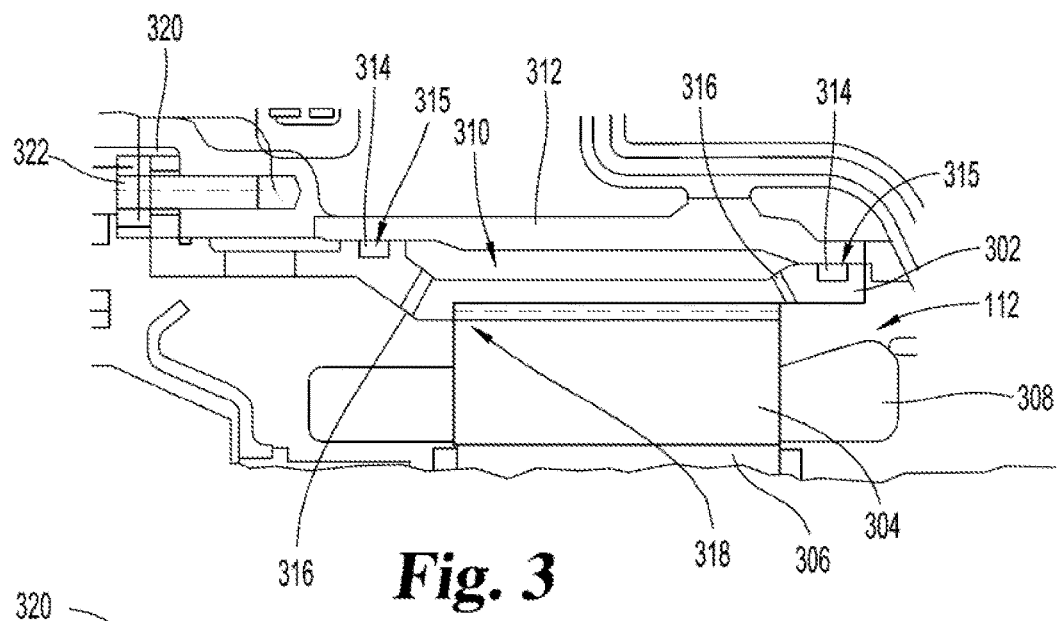
FIG. 3 is an enlarged cross-sectional view of a hybrid module with a cooling sleeve that includes a shoulder.

FIG. 3 shows an enlarged view of the upper section of an earlier design of the hybrid module. As can be seen, the eMachine 112 is received inside a cooling sleeve 302. The eMachine 112 includes a stator 304 and a rotor 306. As should be recognized, the stator 304 contains a number of windings 308 configured to create a magnetic field when current is applied to the stator 304. On the other hand, the rotor 306 is in the form of a permanent magnet. In one particular example, the permanent magnet in the rotor 306 is formed by a stack of magnetic plates, but it is envisioned that the rotor 306 can come in other forms. Both the rotor 306 and stator 304 can include materials that are easily magnetized. For instance, in one example the rotor 306 and stator 304 are made from a silicon steel or other powdered metals. It is envisioned that they can be made of different materials in different embodiments. The majority of the heat in the eMachine 112 is produced by the stator 304. In particular, windings 308 of the stator 304 produce significant heat, and if the heat is somehow not relieved, detrimental heating of the eMachine 112 may occur, which could lead to failure. To combat overheating issues, the hybrid module utilizes lubricant, such as oil, to cool windings 308 of the stator 304. Looking at FIG. 3, the cooling sleeve 302 forms a cooling jacket around which lubrication or other fluids are circulated. Specifically, the sleeve 302 has a fluid channel 310 that is defined between the cooling sleeve 302 and hybrid module housing 312. The majority of heat from the eMachine 112 is generated in the stator 304 and part of this heat is transferred via conduction to the cooling sleeve 302. The lubricant, such as oil, flowing in the fluid channel 310 carries this heat away. To seal the fluid channel 310, the hybrid module further incorporates seals 314 that seal the fluid channel 310. The cooling sleeve 302 has grooves 315 in which the seals 314 are received. To cool the windings 308, the cooling sleeve 302 has spray openings 316 positioned to spray the fluid onto the windings 308 of the stator 304. In another embodiment, the cooling sleeve 302 does not include any spray openings 316, but instead, heat is mostly drawn from the stator 304 through conduction with the cooling sleeve 302 and transferred to the lubricant flowing in the fluid channel 310.

During assembly with this earlier design in FIG. 3, the stator 304 is pressed up to a shoulder 318 on the cooling sleeve 302. The shoulder 318 in the cooling sleeve 302 provides the stator's axial location in the sleeve 302. The cooling sleeve 302 is then located into the housing 312 by one or more tabs 320, which are clamped to the housing 312 by one or more bolts 322. As a result of the assembly process, the location of the stator 304 in the eMachine 112 is then influenced by the manufacturing tolerances of the housing 312, as well as of the cooling sleeve 302. Generally, this design allows manufacturing tolerances in the cooling sleeve 302 to affect the final location of the stator 304 in the eMachine 112. Any misalignments or slipping between components in the hybrid module 104 can result in catastrophic failure. High precision manufacturing techniques and equipment are then needed in order to form the shoulder 318 in the cooling sleeve 302, which in turn results in a more costly manufacturing process. Moreover, the tolerances in the design of FIG. 3 affect the axial distance between the location of the surface of the tab 320 and the shoulder 318 against which the stator 304 presses. Since these two locating surfaces are on opposite sides of the cooling sleeve 302 (i.e., inside vs. outside), it takes special fixtures and tooling to control them accurately. The location of the stator 304 is also affected by any debris that might be present on the mating surfaces, including impregnating varnishes from the stator manufacturing process.

Figure 4:
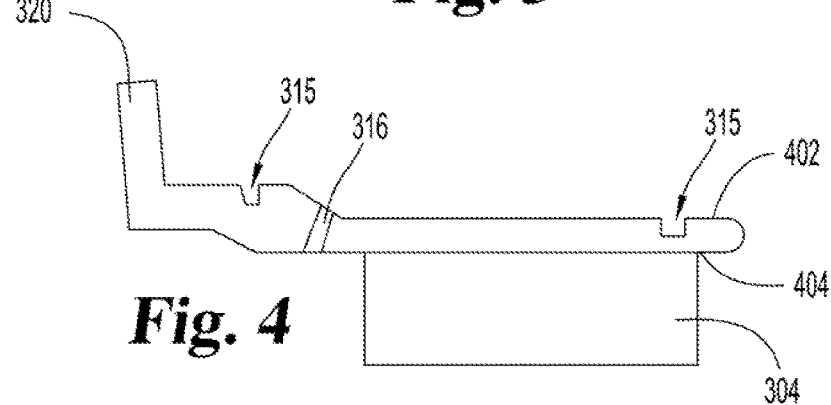
FIG. 4 is a cross-sectional view of a stator secured to a cooling sleeve without a shoulder.
Figure 5:
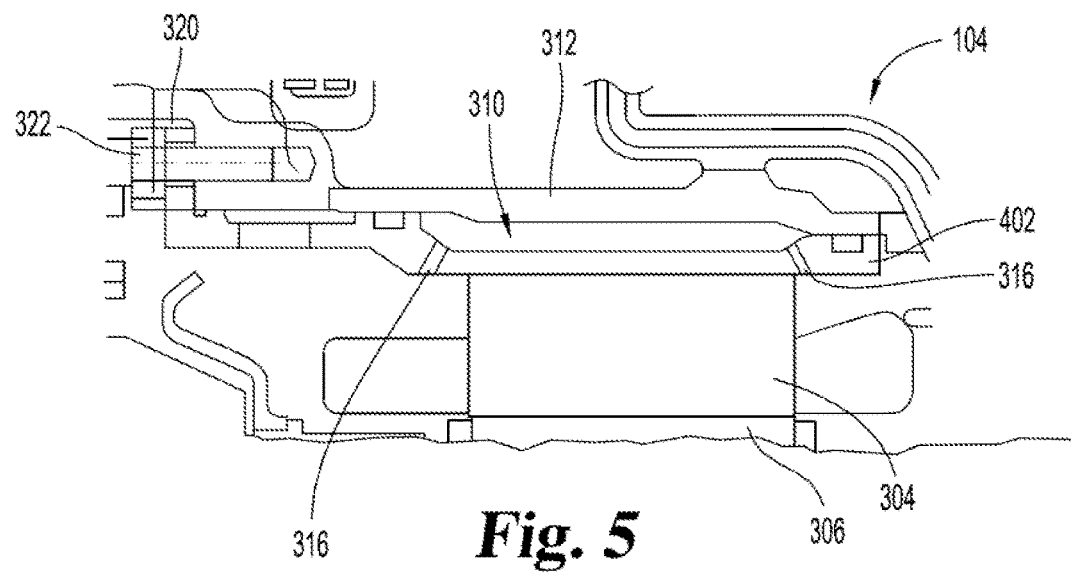
FIG. 5 is an enlarged cross-sectional view of a hybrid module with the FIG. 4 cooling sleeve.

A cooling sleeve 402 that addresses the above-mentioned issues as well as other issues is illustrated in FIG. 4. In the illustrated example, the stator 304 is secured to the cooling sleeve 402 via an interference fit, commonly known as a press fit or friction fit. As should be appreciated, a press fit occurs between two parts by friction rather than by any other means. The cooling sleeve 402 illustrated in FIG. 4 contains a number of features in common with the one described above with reference to FIG. 3. For instance, the cooling sleeve 402 illustrated in FIG. 4 includes one or more grooves 315 for receiving the seals 314, one or more spray openings 316, and one or more tabs 320. Unlike the cooling sleeve 302 in FIG. 3, the cooling sleeve 402 in FIG. 4 has a stator contacting surface 404 that lacks the shoulder 318. In other words, the stator contacting surface 404 for the cooling sleeve 402 in FIG. 4 is generally flat and lacks any structure for pressing against or otherwise locating the stator 304.

During assembly, forces are applied to the stator 304 so as to press the stator 304 into the cooling sleeve 402 in order to form a press fit. In one example, set-up fixtures are used to press the stator 304 to the proper location in the cooling sleeve 402. It should be recognized that the press fit between the stator 304 and the cooling sleeve 402 can occur in other manners besides through force, such as through thermal expansion and/or contraction. The press fit formed between the stator 304 and the cooling sleeve 402 has a sufficient strength to carry the complete torque generated by the eMachine 112 so the stator 304 will never move relative to the sleeve 402 through the life of the hybrid system 100. The stator 304 is pressed into the cooling sleeve is 402 to a pre-determined location to compensate for manufacturing tolerances for parts that would affect its axial location inside the hybrid module 104. Once the stator 304 is joined to the cooling sleeve 402, the assembly can then be inserted into the housing 312 and secured via the bolts 322 at tabs 320. Afterwards, the rest of the hybrid module 104 is then assembled.

This assembly technique and sleeve design simplifies manufacturing of the cooling sleeve 302 by eliminating the shoulder 318 and the additional stepped-down diameter. Moreover, it reduces tolerances that affect the stator's location. Some of the tolerances from manufacturing the sleeve no longer affect the axial location of the stator 304. The location variability from debris, or varnish, that may be present on the face of the stator 304 are eliminated. The location of stator 304 can be set from the tabs 320 on the cooling sleeve 402, which are the same surfaces that locate the sleeve 302 in the housing 312 of the hybrid module 104. Consequently, the final position of the stator 304 is more precisely controlled.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A hybrid system, comprising:
   a hybrid module including
      a hybrid module housing,
      an eMachine including a rotor and a stator, wherein the stator includes windings,
      a clutch operatively connected to the eMachine to connect and disconnect the eMachine from an engine;
      a cooling sleeve received inside the hybrid module housing, wherein the cooling sleeve and the hybrid module housing define a fluid channel through which lubricant flows for cooling the eMachine,
      wherein the stator of the eMachine is press-fitted inside the cooling sleeve,
      wherein the cooling sleeve has one or more tabs extending transverse to the rest of the cooling sleeve, wherein the cooling sleeve has spray openings, and
wherein the tabs of the cooling sleeve are clamped to the hybrid module housing to position the spray openings at a position to spray the lubricant onto the windings to cool the stator; and an automatic transmission connected to the hybrid module to transfer power from the hybrid module.

2. The hybrid system of claim 1, further comprising:
one or more bolts securing the cooling sleeve to the hybrid module housing.

3. The hybrid system of claim 2, further comprising:
wherein the sleeve includes one or more seal grooves; and
one or more seals received in the seal grooves for sealing the fluid channel.

4. The hybrid system of claim 3, wherein the cooling sleeve has a stator contacting surface contacting the stator, the stator contacting surface being flat.

5. The hybrid system of claim 3, wherein the rotor includes a permanent magnet.

6. The hybrid system of claim 5, wherein the rotor includes a stack of magnetic plates.

7. The hybrid system of claim 6, further comprising a transmission/hybrid control module configured to control the operation of the transmission and the hybrid module.

8. The hybrid system of claim 1, further comprising:
wherein the sleeve includes one or more seal grooves; and
one or more seals received in the seal grooves for sealing the fluid channel.

9. The hybrid system of claim 8, wherein the cooling sleeve has a stator contacting surface contacting the stator, wherein the stator contacting surface lacks a shoulder.

10. The hybrid system of claim 8, wherein the rotor includes a permanent magnet.

11. The hybrid system of claim 8, wherein the rotor includes a stack of magnetic plates.

12. The hybrid system of claim 8, further comprising a transmission/hybrid control module configured to control the operation of the transmission and the hybrid module.

13. The hybrid system of claim 1, wherein the cooling sleeve has a stator contacting surface contacting the stator, the stator contacting surface being flat.

14. The hybrid system of claim 13, wherein the stator contacting surface lacks a shoulder.

15. The hybrid system of claim 13, wherein the rotor includes a permanent magnet.

16. The hybrid system of claim 3, wherein the rotor includes a stack of magnetic plates.

17. The hybrid system of claim 13, further comprising a transmission/hybrid control module configured to control the operation of the transmission and the hybrid module.

18. The hybrid system of claim 1, wherein the rotor includes a permanent magnet.

19. The hybrid system of claim 18, wherein the rotor includes a stack of magnetic plates.

20. The hybrid system of claim 1, further comprising a transmission/hybrid control module configured to control the operation of the transmission and the hybrid module.

* * * * *